Patented Apr. 2, 1940

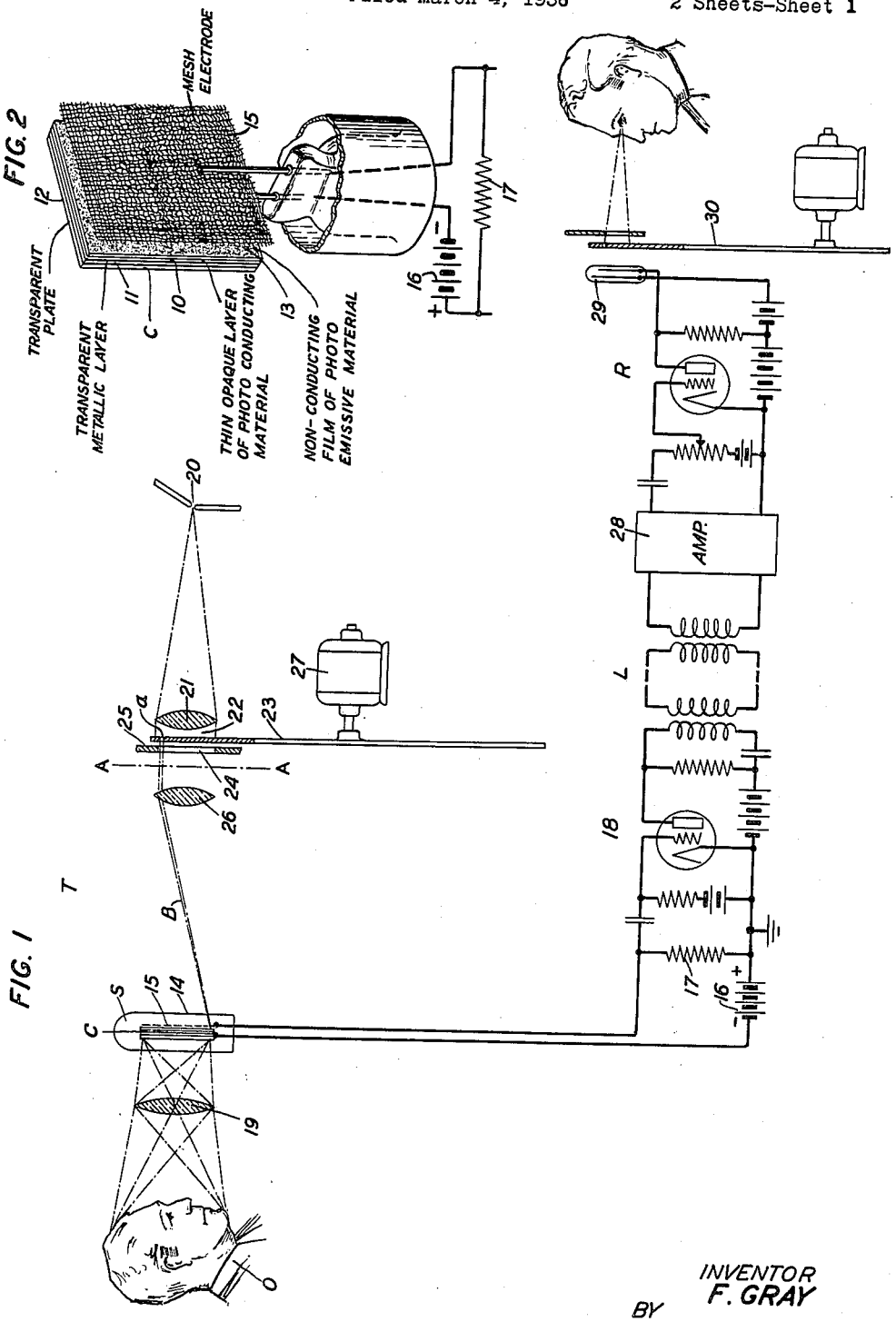

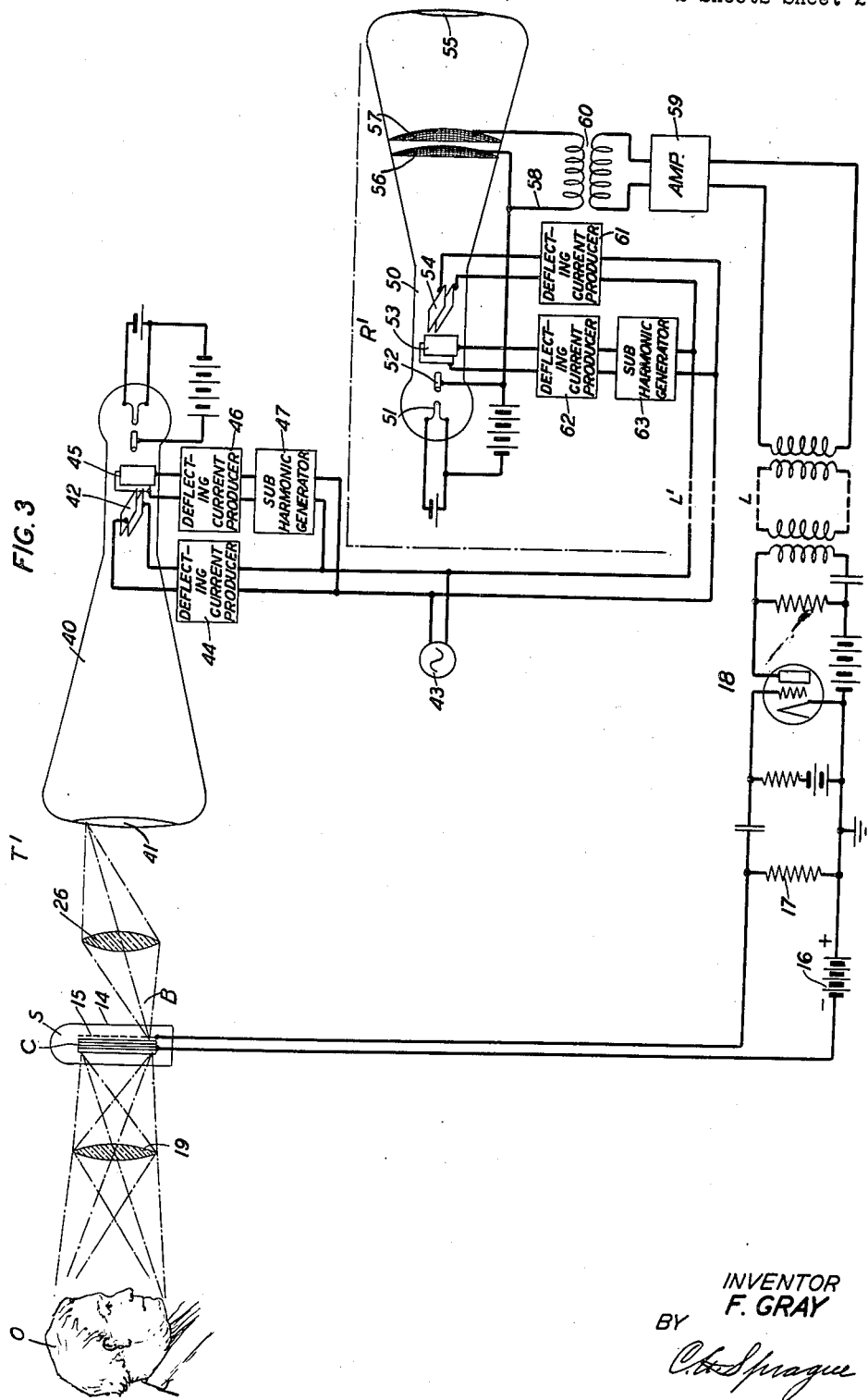

2,195,486

UNITED STATES PATENT OFFICE 2,195,486

ELECTRO-OPTICAL SYSTEM

Frank Gray, New York, N. Y., assignor to Bell Telephone Laboratories, Incorporated, New York, N. Y., a corporation of New York Application March 4, 1936, Serial No. 67,058

17 Claims. (Cl. 178—7.2)

This invention relates to electro-optical systems and more particularly to a method of and means for setting up electric currents representative of the various light-tone values of an object, as in television scanning.

An object of this invention is to provide a novel method of, and means for, translating the light-tone values of elemental areas of an object into a succession of current variations.

Another object of this invention is to provide a compact and relatively inexpensive light sensitive electric unit adapted to be used at a television transmitting station and capable of receiving an image of the entire object or field to be scanned and, under the influence of a scanning beam of radiant energy, capable of translating the light-tone values of the elemental areas of the image into electric current variations for transmission to a receiving station.

A further object is to provide a novel method of, and means for, translating light variations into electric current variations, as for example, in the production of image currents in television systems, by making use of a relatively thin plate-like element of photo-conducting material of high specific resistance upon which the light variations are impressed as a capacity dielectric element for successively storing electric charges respectively proportional to the variations of light from element to element of one surface of the film, and utilizing the storage effects to control the production of an image current.

According to one embodiment of this invention, chosen for purposes of illustration and hereinafter described in detail, a gas-tight container encloses an image target or screen and a fine mesh electrode spaced therefrom. This target or screen comprises a transparent plate coated with a transparent metallic layer carrying a thin, continuous, opaque, photo-conducting layer of high specific resistance which, in turn, is preferably covered with a very thin photo-emissive surface or film. This photo-emissive surface may consist of a number of discrete globules. The mesh electrode is adjacent this photo-emissive face of the target. The metallic layer and the mesh electrode are connected together by a circuit external to the container which includes a battery in series with a resistance adapted to be included in a transmission circuit. An image of the field to be scanned is projected through the transparent plate and the metallic layer onto one face of the photo-conducting layer to successively vary the conductivity of the elemental areas of said layer in accordance with the light-tone values of the corresponding elemental areas of the object, and a moving beam of light passes through the interstices of the mesh electrode and sweeps the photo-emissive film to set up a moving beam of electrons to the mesh electrode. On the first passage of the moving beam of light over the photo-emissive film, a positive charge is laid down over its surface because of the emission of electrons from the material to the positively charged mesh electrode. Due to the high specific resistance of the photo-conducting material a number of elemental condensers between the photo-emissive film and the negatively charged transparent metallic layer are charged up. During the interval of time between successive scannings of the same elemental area, which is usually of the order of one-twentieth of a second for television systems, each elemental capacity partially discharges through the photo-conducting material in accordance with the light-tone value of the corresponding elemental area of the object. On the next passage of the beam of light, each elemental capacity is again charged to its normal voltage and the instantaneous surge of current is proportional to the charge that leaked off during the preceding one-twentieth of a second. The successive surges from the elemental areas charged in turn produce a television or image current which flows through a resistance in the grid circuit of a transmitting amplifier.

Television scanning arrangements in which an image of the object is focussed upon a plate-like structure of photo-conducting material, the elemental areas of which are then directly or indirectly scanned to set up the image currents, have heretofore been suggested. It has been thought essential, however, that the photo-conducting layer be in the form of separate discrete elements corresponding to the elemental areas of the image or that some structure be provided to avoid the loss of image detail due to lateral flow of current. In accordance with this invention in its preferred form the photo-conducting layer is continuous and of sufficient thickness to be opaque. It has been found that a layer of photo-conducting material may be thick enough to be opaque and still be thin enough so that there is no serious loss of image detail due to its lateral conductivity provided it is of sufficiently high specific resistance. If desired the lateral conductivity may be decreased by roughening or scoring the metal plate.

It was stated just above in briefly describing the invention that a moving beam of light is employed to sweep the photo-emissive layer to set up a moving spot of electronic emission. In accordance with one aspect of this invention this moving beam of light is produced without the use of moving mechanical parts. A simple and relatively inexpensive form of cathode ray tube is employed to generate a moving spot of light which is imaged on the photo-emissive film. As cathode ray devices which contain not only the necessary elements for producing the moving cathode beam but also a light sensitive target or screen structure are costly and as cathode ray devices in general soon deteriorate and have to be replaced, there is a marked advantage in the arrangement in accordance with this invention in which the light sensitive element forms a separate compact unit to be scanned, not directly with the cathode ray but with a spot of light generated by a simple and therefore cheap, form of cathode ray tube which includes a fluorescent screen.

The photo-emissive film or layer may be so thin and of such high resistance material that it has no appreciable lateral conductivity. In this situation the film may be continuous. As an alternative arrangement photo-sensitive elements may be deposited on the photo-conducting layer in globular form or the layer may be coated with patches of a suitable metal, such as silver, and these patches sensitized with an alkali metal. If the photo-conducting material also possesses the property of being photo-emissive, the photo-emissive film may be dispensed with.

The invention will be more readily understood by referring to the following description, taken in connection with the accompanying drawings forming a part thereof, in which:

Fig. 1 is a diagrammatic representation of a television system including the invention;

Fig. 2 is an enlarged perspective view of the assembly within the scanning tube; and Fig. 3 diagrammatically illustrates a second television system involving the invention.

Referring more particularly to the drawings, the system of Fig. 1 comprises, in general, a television transmitter T, suitable connecting media L, and a television receiver R.

The transmitter T includes an optical system for forming an image of an object or field of view O on a film of photo-conducting material forming an element of the target or screen C of the scanning device S, and optical means for producing a moving beam of radiations for scanning the target.

The scanning tube S comprises a gas-tight container 14 enclosing an assembly including a fine mesh electrode 15 and spaced therefrom an image target or screen, represented generally as C. As an aid to the description of the system of Fig. 1, reference will now be made to Fig. 2 which is an enlarged perspective of the assembly within the scanning tube S. The target or screen C comprises elements in the following order (starting from the side away from the electrode 15): a transparent plate 12 of glass or similar material coated with a transparent metallic layer 11 (which is preferably a thin coating of silver) carrying a thin layer 10 of high resistance photo-conducting material, the conductivity of which is increased by light, and which is in turn covered with a very thin film 13 of a photo-emissive material, such as any suitable form of an alkali metal. In the description the positive electrode 15 is shown as a wire gauze in front of the photo-emissive surface 13, but this anode may be made in other forms, and if desired it may be merely a conducting coating partially covering the inside of the glass container.

The fine mesh electrode 15 is adjacent the photo-emissive surface 13 and is connected to the transparent metallic layer 11 by an external circuit, including a battery 16 in series with a resistance 17 which is included in the input circuit of an amplifier 18. The negative terminal of the battery 16 is connected to the metallic layer 11 and the positive terminal of the battery is connected through the resistance 17 to the electrode 15.

The object or field of view O is illuminated by radiations from a source (not shown) and radiations reflected from this object are gathered by an optical system, represented generally by the lens 19, and projected through the transparent plate 12 and the transparent metallic layer 11 onto one face of the photo-conducting layer 10, whereby the conductivity of the small areas of this layer is successively controlled in accordance with the intensity of the radiations incident thereon and hence in accordance with the tone values of the corresponding elemental areas of the object.

Associated with the scanning tube S is a second optical means comprising a source of radiations 20 and a lens system, represented generally by a lens 21, for gathering radiations from the source 20 and supplying them in the form of a beam 22 to a peripheral portion of the disc 23, provided with a series of apertures $a$ arranged in the form of a spiral, through which, one at a time, portions of the beam from the source 20 pass to produce a moving beam of radiations B of small dimensions, which passes through an opening 24 in an opaque mask or shutter 25 and a lens system illustrated generally as a lens 26. The moving beam of radiations passes through the interstices of the electrode 15 to sweep across the photo-emissive material 13 of the target C. The opening 24 is of such shape and dimensions that light from only one aperture is permitted to emerge at a time.

The disc 23 is driven by a motor 27 to cause the apertures $a$ to pass through the beam 22 and thereby produce a moving beam of radiations B which traverses successive unit lines of the photo-emissive film 13, once per revolution and at a rate within the persistence of vision.

On the first passage of the moving beam of radiations B, the elemental areas of the photo-emissive film 13 are caused to emit electrons successively to the mesh electrode 15 leaving each elemental area of the film 13 positively charged. The radiations from the object cause the photo-conducting layer 10 to become slightly conducting, the degree of conductivity of any elemental area depending on the intensity of the radiations falling thereon which in turn is dependent on the light-tone value of the corresponding elemental area of the object or field of view O. The photo-conducting layer 10 is of such high specific resistance that it can be considered as a dielectric element between the positive charge on its front surface (created by the emission of electrons from the photo-emissive film 13) and the negatively charged transparent metal layer 11 contiguous to the rear surface of the photo-conducting film 10. Although the photo-conducting member 10 must be practically a dielectric, it must also possess photo-conducting properties so that during the time interval between successive scannings of the same elemental area, which in ordinary television systems is of the order of one-twentieth of a second, the amount of the charge leaking off to the metal layer 11 though the layer 10 is proportional to the light-tone values of the object or field of view. Thus, each elemental capacity is partially discharged through the photo-conducting material in accordance with the light intensities falling on the elemental areas of the photo-conducting layer 10 from the object O. On the next passage of the beam of light, each elemental capacity is again charged to its normal voltage as the positive charge is restored, and the instantaneous surge through the elemental capacity and external circuit including the resistance 17 and battery 16, is equal to the charge that leaked off during the preceding one-twentieth of a second.

If the photo-conducting layer 10 is made very thin, the current surge may be a large one because of the large capacity effect. The successive surges from the elemental areas recharged in turn produce a television or image current which flows through the external circuit.

Since the layer 10 is quite thin and is of high specific resistance, its lateral conductivity is negligible in comparison with its conductivity through the film, and there is no serious loss of image detail due to lateral flow of current. Experiments and calculations indicate that the layer should be thinner than the diameter of an elemental area (assuming the elemental scanning spot to be circular). Thus a film or layer having a thickness of one-tenth of the diameter of an elemental area was found to have negligible loss of image detail due to lateral flow of current. For a more complete description of the relation between the thickness of a high resistance film and the lateral flow of current therein, reference may be made to application Serial No. 67,057, filed March 4, 1936, for Frank Gray. The material of the photo-conducting layer 10 should be of high enough specific resistance so that the positive charge (applied to one surface by the emission of electrons from the light sensitive film carried thereby) leaks through the film slowly, the rate of leakage, of course, being dependent upon the illumination of the particular elemental area. For a more complete description of the relation between the specific resistance of the photo-conducting material and the rate of leakage together with a more complete description of the so-called "storage" method of operation, reference may be made to Patent 2,150,160, issued March 14, 1939 to Frank Gray. Suitable materials for the photo-conducting layer operating as above described are mercury iodide and native sodium chloride.

If a photo-conducting material as, for example, selenium is used which does not have a high enough specific resistance to operate by the "storage" method as described in the above-mentioned Gray Patent 2,150,160, the device is still operative but not as effectively. Due to the comparatively low specific resistance of selenium, it must be separated into discrete particles, as, for example, by cross-hatching the layer with closely spaced lines, or otherwise treated to decrease its lateral conductivity so that the lateral diffusion of the image will not be objectionable. Also because of the low specific resistance, the positive charges immediately leak through the layer so there is no storage of charges across the photo-conducting layer. As this method of operation depends upon the drop in voltage across the elemental areas of photo-conducting layer, it has for convenience been called the "resistance" method. The "storage" method has the advantages that a larger image current is produced and that the layer 10 is continuous, and hence, simpler to construct.

The photo-emissive film may be made of a suitable alkali metal such as caesium, sodium, or potassium or one of their compounds. The film may be continuous or of discrete particles depending on the specific resistance of the material used. The film may be made by forming a compound of an alkali metal and the photo-conducting material.

The image current which flows through the resistance 17, after being raised to the desired power level by the device 18, which may comprise a multistage amplifier, is transmitted over the connecting medium L to a remote station including a receiver R. For line carrier or radio transmission, the amplified image current is used to modulate a carrier current of the proper frequency for transmission.

Receiver R may comprise an amplifier 28, the output circuit of which includes a glow lamp 29 which cooperates with a rotating disc 30 having a series of apertures arranged in a spiral and adapted to be driven in synchronism and in phase with the disc 23 at the transmitter to produce an image of the object or field of view scanned at the transmitter. In the case of line carrier or radio transmission, the receiver would include means for detecting or demodulating the incoming modulated carrier wave to yield the image current, which would be supplied to the glow lamp either directly, or after amplification if found necessary. Any suitable receiver for the purpose may be used. A satisfactory receiver is disclosed in U. S. Patent 1,728,122, September 10, 1929 to Horton, which may include a glow lamp of the type disclosed in U. S. Patent 1,918,308, July 18, 1933 to Weinhart, provided with a gas charge of the character disclosed in U. S. Patent 1,871,266, August 9, 1932 to Gray.

Any suitable system may be used to maintain the discs 23 and 30 in synchronism and in phase. A satisfactory system for this purpose is disclosed in U. S. Patent 1,999,376 of H. M. Stoller, issued April 30, 1935.

The system of Fig. 3 differs from that described above mainly as to the means provided at the transmitter to produce the moving beam of light for scanning the photo-emissive film 13 and hence the photo-conducting layer 10 and also in that it includes a different type of image producer at the receiving station.

The source of radiations for the scanning beam B in the transmitter T' of this figure comprises a cathode ray oscillograph tube 40 of well-known design which is substituted for the elements to the right of section line A—A in Fig. 1. The cathode beam of the tube 40 is deflected in two directions at right angles to each other and at such relative speeds in the two directions that the fluorescent screen 41 is activated to produce a moving spot of light which moves across the screen in a series of parallel lines and from top to bottom in a time interval within the period of persistence of vision.

Deflection of the beam in one direction is effected by means of the field between a pair of deflecting plates 42 which plates are supplied with current having a sawtooth wave form, production of this current being controlled by oscillations of line scanning frequency supplied by the oscillator 43 to the deflection current producing device 44. Deflection in the other direction is produced by supplying a second pair of deflecting plates 45 with current, also of sawtooth wave form, supplied by the deflection current producing device 46, controlled by oscillations of image cycle frequency produced by a sub-harmonic generator 47, supplied with oscillations from the oscillator 43. Any suitable apparatus, such as that disclosed in U. S. Patent 1,613,954, January 11, 1927, to Knoop, may be used to produce the deflecting currents.

Radiations from the moving spot of light are directed by the lens system 26 through the interstices of the mesh electrode 15 to scan successively the elemental areas of the photo-emissive film 13 of the target C. An image of the field O to be scanned is projected on the layer 10 through the transparent plate 12 and metallic layer 11 in the manner described in connection with Fig. 1. In accordance with that description an image current varying with the tone values of the elemental areas of the object O is caused to flow through the external circuit including the resistance 17, and, after amplification by the device 18, a magnified image current is supplied to a transmission circuit and over a line L, or a line carrier or radio channel, to a distant receiving station which includes a receiver R'.

Receiver R' may include an amplifier, in case the image current is directly transmitted, or a demodulator and amplifier, in case transmission is effected in accordance with line carrier or radio practice. It also includes a cathode ray discharge device 50 comprising a cathode 51 and an anode 52 for producing the cathode beam, two pairs of plates 53 and 54 for respectively effecting deflection of the beam in two directions at right angles to each other, a fluorescent screen 55, and a pair of control grids 56 and 57 connected by an external circuit 58 to which the image currents received over line L and amplified by the device 59 are supplied by means of a transformer 60. Auxiliary apparatus 61, 62 and 63, similar to the auxiliary apparatus described in connection with transmitter T' of Fig. 3 and for a similar purpose are associated with the receiver R'. Devices 61 and 62 operate, as disclosed in the Knoop patent, to supply deflecting current of sawtooth wave form to respective pairs of deflecting plates 54 and 53. The apparatus for producing the deflecting currents is controlled by current of line scanning frequency received from the oscillator 43 at the transmitting station over a transmission line L'. In this manner, the cathode beam of the receiver R' is deflected in synchronism and in phase with the deflection of the cathode beam of the cathode ray discharge device 40 used for producing the scanning spot at the transmitter.

The cathode ray discharge device 50 operates in the following manner:

The control electrodes or grids 56 and 57 are closely adjacent each other in a position between the anode 52 and the fluorescent screen 55 and comprise segments of a sphere, the centers of which are close to the centers of the deflecting fields produced by the plates 53 and 54. The grid 56 is maintained at substantially the same potential as the anode 52 and the signal potentials are applied to the grid 57 which may be negatively polarized with respect to grid 56. The two grids, therefore, serve to define a very limited zone in which the signal potentials are effective for controlling the cathode beam, and this zone is substantially isolated from the equipotential section established between the anode 52 and the grid 56, within which zone deflection of the beam is effected. In this manner, deflection of the beam is controlled by the fields established between the pairs of plates 53 and 54 without being influenced by the signal potentials, and the signal potentials operate to control the velocity or number of electrons constituting the beam and hence the intensity of the excitation of the fluorescent screen, which determines the quality of the image produced, without causing the direction of travel of the electrons to be varied. In other words, the two sets of elements for respectively controlling the deflection and intensity of the beam, each of which tends to interfere with the other and thereby cause loss of focus of the beam and distortion of the image, are so positioned and electrically controlled as to materially, if not completely, avoid such interference. For a more complete disclosure of the construction and method of operation of the image producing cathode ray device 50 briefly described above, reference may be made to Patent 2,155,192, issued April 18, 1939 to J. B. Johnson, filed July 7, 1930.

Other changes may be made without departing from the spirit or principles of the invention as hereinbefore expressed, the scope of which is defined by the appended claims. In the claims, the term "light" is intended to cover radiations from the entire range of the spectrum, both visible and invisible, while the term "radiant energy" or "radiations" is used as a broader term intending to cover "light" waves, as defined above, as well as other forms of radiations, as for example, cathode rays, electron beams, emission from radio-active materials, radio waves, and the like. While an important aspect of the invention is that involving light as the scanning medium, the invention in certain aspects is not limited to this medium, as appears from the claims.

While the invention described above is preferably operated by the "storage" method, it is to be understood that the invention in certain aspects is not limited to this method, but is broad enough to include operation by the "resistance" method, as also appears from the claims. Where it is recited in the claims that one element is "contiguous" to another, this is intended to mean that the elements are in contact and touching one another.

What is claimed is:

1. The combination with a thin plate-like element of photo-conducting material having a photo-emissive surface thereon, of a transparent metallic plate in contact with one face of said element, an anode, circuit connections between said plate and said anode, means for illuminating one face of said photo-conducting element, and means for directing a moving pencil of light toward the photo-emissive surface of said element.

2. The combination with a thin plate-like element of photo-conducting material, of a transparent metallic plate in contact with one face of said element, photo-emissive material on the other face of said element, an anode on the side of said element opposite said plate, circuit connections between said plate and said anode, means for illuminating said element through said plate, and means for scanning said photo-emissive material with a pencil of radiant energy while said photo-conducting element is illuminated.

3. The combination with a gas-tight container, of an assembly therein comprising a thin plate-like element of photo-conducting material, a photo-sensitive film on one face of said element, and light transmitting metallic members respectively on opposite sides of said element.

4. An electro-optical device for producing a signal current comprising a container enclosing a photo-conducting layer and a photo-emissive film on one face of said layer, optical means for illuminating the surface of said layer opposite said film in accordance with the light-tone characteristics of a subject to be transmitted, and means for producing a moving beam of light to scan the surface of said film.

5. An electro-optical apparatus comprising a container enclosing a photo-conducting member and a photo-emissive element in contact therewith and cooperating therewith, means for illuminating said member with light from a subject, and means for producing a moving beam of light for scanning said photo-emissive element.

6. An electro-optical apparatus comprising a container enclosing a photo-conducting layer and a photo-emissive film in contact therewith and cooperating therewith, means for illuminating said layer, and means outside said container for producing a moving beam of light for scanning said film.

7. An image current producer comprising means enclosing a photo-conducting member and a photo-emissive element in contact therewith and cooperating therewith, means for illuminating said member, and a cathode ray discharge device, separate from said first-mentioned means, for controlling the scanning of said photo-emissive element with a beam of light.

8. A scanning apparatus for electro-optical systems comprising a gas-tight container enclosing a composite target and an anode, said composite target comprising a transparent plate, a transparent metallic layer, and a high resistance photo-conducting layer having a photo-emissive film, and an external connection between said anode and said metallic layer.

9. A scanning apparatus for electro-optical systems comprising a gas-tight container enclosing a composite target and an anode, said composite target comprising a transparent plate, a thin, transparent metallic layer, a thin, continuous, opaque, photo-conducting layer having a photo-emissive film therefor, said film being substantially non-conducting laterally, means for projecting an image of an object or field of view on said photo-conducting layer, means external to said container for producing a moving beam of light and for causing said beam to scan said photo-emissive film, and circuit connections between said anode and said transparent metallic layer, said photo-conducting layer being of such high specific resistance and so thin compared to the diameter of the scanning beam that its lateral conductivity is negligibly small.

10. An electro-optical system comprising a container enclosing a target comprising a plurality of layers in contact with each other and each sensitive to radiant energy, means for applying to one of said layers radiations controlled by the light-tone characteristics of an object or field of view, and means for applying to another of said layers a beam of light.

11. In combination, an opaque photo-conducting element which is normally conducting when illuminated, in accordance with the degree of illumination, means for throwing an image of an object on this photo-conducting element to change its conductivity at each elemental area thereof in accordance with the light received thereon, a photo-emissive layer on a side of the photo-conducting element which prevents it from receiving light from the object, means for directing a beam of radiations of constant intensity to the photo-emissive layer only, and an anode for receiving electrons released from the photo-emissive layer under the action of said beam of radiations of constant intensity and under the action of a field produced by an external source of electromotive force.

12. The combination with a gas-tight container, of an assembly therein comprising a transparent supporting plate, a thin metal layer on said plate, said layer being at least partially transparent, a thin layer of photo-conducting material in contact with said metal layer, and a photo-emissive film on the face of said photo-conducting layer remote from said metal layer.

13. The combination with a gas-tight container, of an assembly therein comprising a transparent supporting plate, a thin metal layer on said plate, said layer being at least partially transparent, a thin layer of photo-conducting material in contact with said metal layer, a photo-emissive film on the face of said photo-conducting layer remote from said metal layer, and means adjacent said photo-emissive film for collecting electrons emitted therefrom.

14. The combination with a gas-tight container, of an assembly therein comprising a thin element of photo-conducting material, a photo-emissive surface on one face of said element, an element permanently in contact with substantially all the elemental areas simultaneously of the other face of said element, and means adjacent said photo-emissive surface for collecting electrons emitted from said surface.

15. The combination with a gas-tight container, of an assembly therein comprising a transparent supporting plate, a thin metal layer on said plate, said layer being at least partially transparent, a thin layer of photo-conducting material in contact with said metal layer, and a thin continuous photo-emissive film on the face of said photo-conducting layer remote from said metal layer.

16. The combination with a gas-tight container, of an assembly therein comprising a transparent supporting plate, a thin metal layer on said plate, said layer being at least partially transparent, a continuous layer of photo-conducting material in contact with said metal layer, and a photo-emissive film on the face of said photo-conducting layer remote from said metal layer, which film is adapted to be scanned with a beam of radiations, said photo-conducting layer being of such high specific resistance and so thin compared to the diameter of said scanning beam that its lateral conductivity is negligibly small.

17. The combination with a gas-tight container, at least some portions of which are light transmitting, of an assembly therein comprising a transparent supporting plate one face of which is adjacent a transparent portion of said container, a thin metal layer on said plate, said layer being at least partially transparent, a thin, opaque, continuous layer of photo-conducting material in contact with said metal layer, a photo-emissive film on said photo-conducting layer, which film is adapted to be scanned with a beam of radiations which passes through another transparent portion of said container remote from and opposite said first transparent portion and which film is substantially non-conducting along its surface, and metallic, light-transmitting means between said film and said other transparent portion of said container for collecting electrons emitted from said film when it is scanned by said beam, said photo-conducting layer having a thickness which is a fraction of the diameter of the scanning beam and having a specific resistance of at least $10^{10}$ ohms per centimeter cube to substantially prevent lateral conductivity.

FRANK GRAY.